United States Patent Office 3,413,073
Patented Nov. 26, 1968

3,413,073
SUBSTITUTED PARADIAMINO-ANISOLE AND ITS USE FOR DYEING HUMAN HAIR AND KERATINIC FIBERS
Andrée Bugaut, Boulogne-sur-Seine, and Giuliana Ghilardi, Paris, France, assignors to L'Oreal, Paris, France
No Drawing. Filed Apr. 18, 1966, Ser. No. 543,050
Claims priority, application France, Apr. 21, 1965, 14,059
6 Claims. (Cl. 8—11)

ABSTRACT OF THE DISCLOSURE

A new compound having the formula

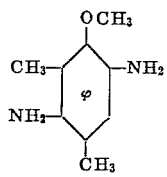

that is suitable for dyeing hair and other keratinic fibers.

---

The present invention relates to the new article of manufacture which consists of a substituted paraphenylenediamine corresponding to the following formula:

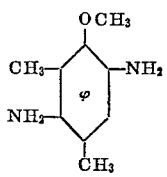

(I)

The compound according to Formula I is a dye which may be advantageously used to color keratinic fibers and especially human hair. The present invention therefore also relates to cosmetic compositions essentially characterized by the fact that they contain the compound according to Formula I in aqueous solution, for example. The said dyes are characterized by the fact that they produce a coloration which is particularly stable to the light and that they increase the range of shades which may be produced using dyes of this general type.

A further object of the invention is to provide a method of applying the said dyes essentially characterized by the fact that cosmetic compositions containing the compound according to Formula I are mixed with an oxidizing solution, for example, hydrogen peroxide, and that this mixture is left in contact with the hair for about 30 minutes.

The invention is also concerned with a process of preparing the compound having the Formula I which process comprises the steps of reducing and acetylating 1-methoxy-2-nitro-4,6-dimethylbenzene to obtain 1-methoxy-2-acetylamino-4,6-dimethylbenzene, nitrating said last mentioned product with nitric acid to obtain 1-methoxy-2-acetylamino - 5 - nitro - 4,6 - dimethylbenzene, deacetylating the substituted group in position 2 of said last mentioned product with hydrochloric acid, and reducing the nitro group in position 5, thereby producing 1-methoxy-2,5-diamino-4,6-dimethylbenzene, which is then transformed into the dihydrochloride.

Two examples showing how the composition according to the invention is prepared and used will now be described.

EXAMPLE 1

(1) Preparation of 1-methoxy-2-acetylamino-4,6-dimethylbenzene 8 cm.³ of acetic acid is poured into 390 cm.³ of water and the mixture is brought to 70° C. 0.331 mol (60 g.) of 1-methoxy-2-nitro-4,6-dimethylbenzene and 111 g. of powdered iron are then added, little by little, while stirring. The mixture which has been kept at 70° C. during this step is then heated half an hour in a boiling water-bath.

After neutralization of the reaction mixture with sodium carbonate, it is boiled dry, and the filtrate is cooled. Sodium chloride is then added, followed by extraction with ether. 38 cm.³ of acetic anhydride are then added to the resulting extract, after it has first been dried on sodium sulfate.

After cooling, 35 g. of 1-methoxy-2-acetylamino-4,6-dimethylbenzene, practically pure, which melts at 92° C., is obtained by drying.

| Analysis of product obtained | Calculated for $C_{11}H_{15}O_2N$ | Found |
|---|---|---|
| C, percent | 68.39 | 68.12–68.28 |
| H, percent | 7.77 | 7.54– 7.80 |
| N, percent | 7.25 | 7.44– 7.49 |

(2) Preparation of 1-methoxy-2-acetylamino-5-nitro-4,6-dimethylbenzene 0.112 mol (21.7 g.) of the product obtained in the step just described is dissolved in 85 cm.³ of acetic acid. A mixture comprising 51.5 cm.³ of nitric acid at a density of 1.4 and 25.5 cm.³ of acetic acid is prepared. The first mixture is poured into the second for an hour, while maintaining the temperature between 5 and 10° C. The reaction mixture is then left for an hour at 50° C. and thereafter poured into 300 cm.³ of cracked ice saturated with sodium chloride. When dried, the mixture yields 20 g. of 1-methoxy-2-acetylamino-4,6-dimethylbenzene, practically pure, which melts at 139° C.

| Analysis of product obtained | Calculated for $C_{11}H_{14}O_4N_2$ | Found |
|---|---|---|
| C, percent | 55.46 | 55.52–55.42 |
| H, percent | 5.88 | 6.06– 5.82 |
| N, percent | 11.76 | 11.70–11.85 |

(3) Preparation of 1-methoxy-2-amino-5-nitro-4,6-dimethylbenzene 0.763 mol (181.6 g.) of the product obtained by the foregoing process is added to a liter of hydrochloric acid diluted with 500 cm.³ of water. The mixture is heated for an hour in a water-bath, and after cooling and drying, yields 120 g. of the desired product in the form of the crystallized hydrochloride. This hydrochloride is dissolved in hot water and sodium hydroxide added to bring the pH value to 6. After cooling and drying, the mixture yields 98 g. of 1-methoxy-2-amino-5-nitro-4,6-dimethylbenzene, which melts at 73° C.

(4) Preparation of 1-methoxy-2,5-diamino-4,6-dimethylbenzene dihydrochloride

A mixture is prepared comprising 35 cm.³ of alcohol at 95° C. alcoholic degrees, 7 cm.³ of water, 5.5 g. of powdered zinc, and 0.3 g. of ammonium chloride. The mixture is brought to 70° C. and 0.0185 mol (3.62 g.) of the previously obtained product is added, little by little, while stirring. The hot reaction mixture is dried and poured into 10 cm.³ of concentrated hydrochloric acid. After cooling the filtrate 3.9 g. of the dihydrochloride of 1-methoxy-2,5-diamino-4,6-dimethylbenzene is obtained. After recrystallization in hydrochloric acid this product melts at 220° C.

| Analysis of product obtained | Calculated for $C_9H_{16}ON_2Cl_2$ | Found |
|---|---|---|
| C, percent | 45.19 | 45.26–45.21 |
| H, percent | 6.70 | 6.83– 6.68 |
| N, percent | 11.71 | 11.83–12.01 |

EXAMPLE 2

The following composition is prepared:

|  | G. |
|---|---|
| 3,6 - diamino-2,4-dimethyl anisole dihydrochloride | 16.6 |
| Resorcin | 23.6 |
| 20% lauryl ammonium sulfate | 200 |
| Carboxymethyl cellulose | 20 |
| Sodium bisulfite | 4 |
| Ethylenediamino tetraacetic acid | 3 |
| 20% ammonia | 100 |
| Water, q.s.p., 1000 g. | |

This composition has the appearance of a thick liquid. It is mixed with an equal volume of hydrogen peroxide at 20 volumes and applied to 90% white hair for thirty minutes. The hair is then rinsed, shampooed, and dried.

The result is a rose mauve shade which is stable under light.

EXAMPLE 3

The following composition is prepared:

|  | G. |
|---|---|
| 3,6 - diamino-2,4-dimethyl anisole dihydrochloride | 16.6 |
| 1-amino-5-naphthol | 22 |
| 20% lauryl ammonium sulfate | 200 |
| Carboxymethyl cellulose | 20 |
| Sodium bisulfite | 4 |
| Ethylenediaminotetraacetic acid | 3 |
| 20% ammonia | 100 |
| Water, q.s.p., 1000 g. | |

This composition has the appearance of a thick liquid. It is mixed with an equal volume of hydrogen peroxide at 20 volumes and this mixture is applied to 90% white hair for 30 minutes. The hair is then rinsed, shampooed and dried. A stable violet-grey is obtained.

The cosmetic compositions according to the invention should preferably have a pH between 8 and 10, most preferably between 9 and 9.5.

The cosmetic compositions of the invention may also comprise other dyes for keratinic fibers such as for example azo dyes, anthraquinone dyes, nitro dyes. These compositions may be, as mentioned hereinbefore, aqueous solutions. They may also be or contain organic solvents or thickeners. They may also contain other conventional agents, e.g., surface active agents, softeners, perfumes, and the like.

What is claimed is:

1. A compound having the formula

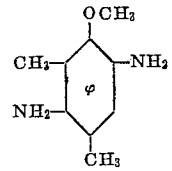

2. An aqueous solution for dyeing keratinic fibers and human hair having a pH value between 8 and 10 and containing the compound of claim 1.

3. The composition as claimed in claim 2 which further contains an oxidizing agent.

4. The method of dyeing human hair which comprises the step of applying thereto a composition having a pH between 8 and 10 containing a dye having the formula

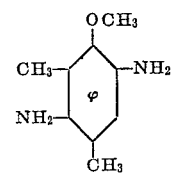

and an effective oxidizing agent, leaving said composition in contact with the hair up to thirty minutes, and then rinsing the hair.

5. The composition of claim 3 wherein said oxidizing agent is hydrogen peroxide.

6. The dihydrochloride salt of 1-methoxy-2,5-diamino-4,6-dimethylbenzene.

References Cited

UNITED STATES PATENTS 2,101,696  12/1937  Wagner et al. _____ 8—11
3,210,252  10/1965  Blanke et al. _____ 167—88

OTHER REFERENCES

Kass: American Perfumer and Aromatics, vol. 68, No. 2, pp. 34–37, August 1956.

ALBERT T. MEYERS, *Primary Examiner.*

V. C. CLARKE *Assistant Examiner.*